Nov. 11, 1969 G. R. CARRUTHERS 3,478,216
IMAGE CONVERTER FOR DETECTING ELECTROMAGNETIC RADIATION
ESPECIALLY IN SHORT WAVE LENGTHS
Filed July 27, 1966

INVENTOR

GEORGE R. CARRUTHERS

BY *Melvin L. Crane* AGENT

*R. S. Sciascia* ATTORNEY

United States Patent Office 3,478,216
Patented Nov. 11, 1969

3,478,216
IMAGE CONVERTER FOR DETECTING ELECTRO-MAGNETIC RADIATION ESPECIALLY IN SHORT WAVE LENGTHS
George R. Carruthers, Washington, D.C., assignor to the United States of America as represented by the Secretary of the Navy
Filed July 27, 1966, Ser. No. 568,360
Int. Cl. H01j 31/50
U.S. Cl. 250—213                     5 Claims

ABSTRACT OF THE DISCLOSURE

This disclosure is directed to a system for detecting radiation in the far ultra-violet region by use of a windowless tube with a solid photocathode and an internal mirror for converting the radiation to visible light.

---

Figure 1:
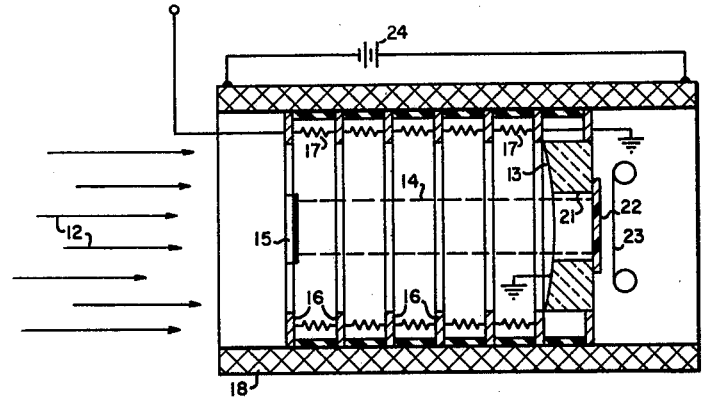

The invention described herein may be manufactured and used by or for the Government of the United States of America for governmental purposes without the payment of any royalties thereon or therefor.

The present invention relates to an electro-optical apparatus and more particularly to a magnetically focused image converter for converting electromagnetic waves, such as ultraviolet waves, into an electron image which may be recorded or into a visible light image which may be observed.

Heretofore, magnetically focused image tubes with external optics have been used to form an ultraviolet image on a semi-transparent photocathode deposited onto the back surface of a lithium-fluoride window or other ultraviolet-transmitting materials have been used. In such tubes, the radiation is incident on the front surface and must pass through the window which effects the quantum efficiency and the wave length cutoff. Other tubes have been used which make use of reflective surfaces that reflect radiation onto a photocathode within an enclosed tube. However, in these converter tubes the incoming radiation passes through optical windows which effect the radiation and which also has a short wave length cutoff above that which is desired in some detector tubes.

The device of the present invention provides an internal optic image converter in which parallel light enters a front opening of the converter tube, and is focused by an internal mirror within the tube structure onto the photocathode. Electrons are emitted from the photocathode due to the incident light and are accelerated in an axial direction along the length of a tube by a uniform electric field, produced by applying a voltage gradient in the axial direction by means of accelerator rings and a voltage divider resistance string. During acceleration, the electrons are focused by a uniform axial magnetic field produced by a coil. The resultant electron image at the image plane is focused onto a phosphor screen or nuclear track emulsion outside of the plane of the mirror. The resultant electron image is nearly an exact reproduction of the optical image on the photocathode wherein the phosphor screen converts the incident electrons into light which may be detected by a camera or any other suitable means, or the electrons may be recorded directly on a nuclear track plate or film.

It is therefore an object of the present invention to provide an image converter for detecting electromagnetic radiation especially in short wave lengths.

Another object is to provide an image converter which has a high resolution and which is uniform over the entire field of view.

Still another object is to provide a device in which the emitting surface of a photocathode is illuminated by incoming light on the same side from which photoelectric emission takes place.

A further object is to provide an electro-optical image intensifier in which the incoming light does not penetrate an element of an enclosure.

Figure 2:
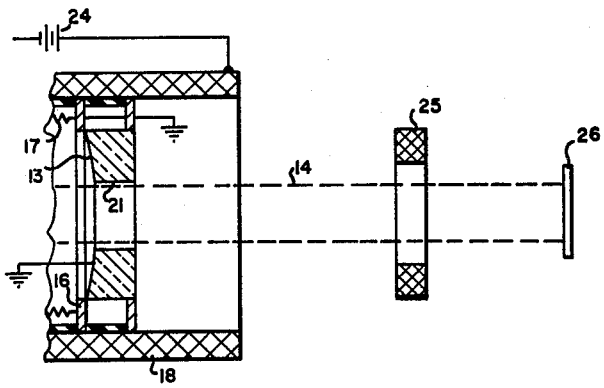
Figure 3:
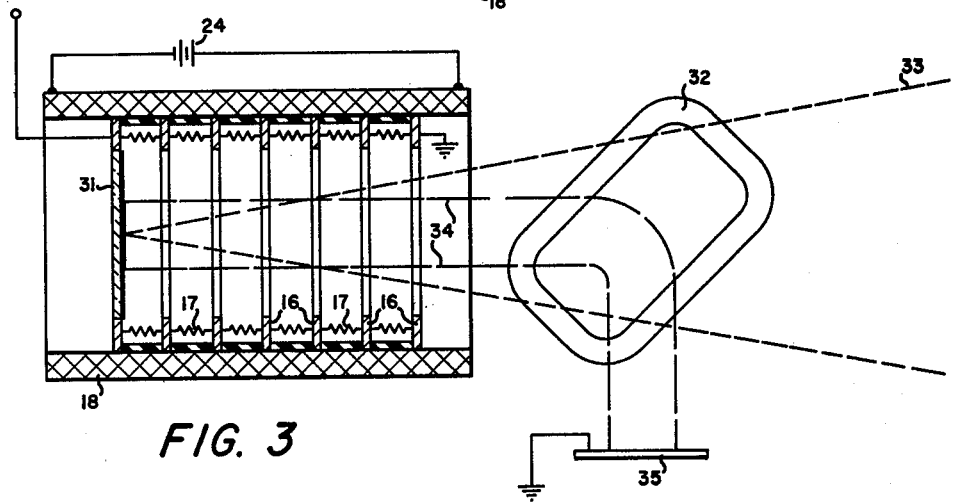

The nature of this invention as well as other objects and advantages thereof will be readily apparent from consideration of the following specification relating to the annexed drawings, in which:

FIG. 1 is a cross-sectional view of a device made in accordance with the present invention; and FIGS. 2 and 3 are modifications of the device shown by illustration in FIG. 1.

As shown in FIG. 1, a beam of parallel light rays 12 are incident on a parabolic mirror 13 having a fully reflective surface for reflecting all incoming radiation back to a photoemissive surface of a cylindrical photocathode 15. The light focused onto the photocathode produces electrons 14 which are emitted from the photocathode and are accelerated in the axial direction by a uniform electric field. The uniform electric field is produced by applying a voltage gradient in the axial direction by means of spaced accelerator rings 16 each of which has a resistor 17 connected therebetween. At the same time the electrons are accelerated in the axial direction by a uniform electric field, the electrons are focused by a uniform axial magnetic field produced by a solenoid 18 which surrounds the accelerating electrodes and resistors as well as the mirror and the photocathode. The primary mirror 13 is provided with an axial aperture 21 therethrough through which the photoelectrons pass to an image plane on the side of the primary mirror opposite from the photocathode. The resultant electron image at the image plane is substantially an exact reproduction of the optical image on the photocathode. In order to record or observe the image produced by the photocathode a nuclear track emulsion 22 or a phosphor screen is assembled on the image plane for reception of the photoelectrons from the photocathode. As such, the photoelectrons are converted to light pulses which are a reproduction of the optical image focused onto the photocathode. Since the photoelectrons are focused onto an image plane the above disclosed structure is suitable for use of an electron sensitive film 23 in the image plane which may be used for recording a picture of the optical image.

The magnetic field coil surrounds the photocathode and the focusing mirror coaxial therewith for creating an axially aligned magnetic field which guides the electrons emitted by the photocathode toward the image plane. The magnetic field coil is suitably energized by a DC source 24 such as a battery or any other desired source of power. The accelerator rings and the voltage divider resistors connected therebetween are connected to a negative high voltage source at the photocathode end of the structure and the opposite end of the electrical circuitry is connected to ground. Thus, the combination of the magnetic field and the electric field focuses the photoelectrons onto the image plane.

FIG. 2 illustrates a modification of the device as shown by illustration in FIG. 1. The device as shown in FIG. 2 includes a structure substantially as shown in FIG. 1 with an additional magnetic deflection coil 25 or an auxiliary magnetic lens at suitable locations outside of the mirror in order to focus the photoelectrons onto a suitable axially aligned target 26 which converts the photoelectrons into a reproduction of the light incident on the mirror.

FIG. 3 illustrates an image converter with a front surface photocathode 31 such as shown in FIG. 1 wherein the device does not include a focusing mirror within the coil structure. The device as shown in FIG. 3 includes two Helmholtz coils 32 on opposite sides of the axis outside of the magnetic focusing coil and located on opposite sides of the axis along which an incoming light beam 33 is focused directly onto the photocathode by suitable optics outside of the device. The photoelectrons 34 emitted by the photocathode due to incidence of the light are accelerated by the electromagnetic fields axially through the device. As the photoelectrons emerge from the electromagnetic field the electrons enter into the magnetic field produced by the pair of Helmholtz coils. The electrons are rotated 90° from the axis by the Helmholtz coils and are incident on an electron sensitive emulsion 35 or a detector which converts photoelectrons into a visible light image which can be recorded by film or any other means. The device as illustrated in FIG. 3 is easy to work with in the wave length range above 1800 angstrom units wheer highly reactive cesium-containing photocathodes are used, as a photocathode does not "see" the nuclear track emulsion. Thus, contaminant molecules outgassing from the track emulsion in the high vacuum of outer space within which the device operates cannot impinge on the photocathode directly. If desired, a pumping port may be placed opposite the emulsion through which the gas molecules are moved before they can collide with any other parts of the tube and be reflected toward the photocathode. Thus, the structure, as shown by FIG. 3, provides a device by which the photocathode will not be contaminated.

On assembly of the converter tube as illustrated in FIG 1, the solenoid or coil has an insulator material covering the outer and inner surface with the inner surface being covered with a ceramic material. The accelerating electrodes or rings are secured within the coil and are spaced from each other by suitable insulator rings or by any other means such as insulator rods. The voltage divider resistors are then electrically connected between the accelerating electrodes. The photocathode, the electron sensitive means, and the focusing mirror are secured relative to the solenoid on the axis thereof with the electron sensitive means positioned on the side of the mirror away from the photocathode. The photocathode is made in the usual manner such as with a glass base having a silver coating evaporated thereon and with a cesium iodide coating thereon. The silver coating is electrically connected to the negative voltage applied to the first accelerating electrode. The focusing surface of the mirror has a reflective coating of electrical conductive material in which the coated surface is connected to ground.

The modification shown by FIG. 2 is made the same as that of FIG. 1 except a magnetic focusing coil is secured about the axis outside of the solenoid and the electron sensitive means is secured juxtaposed the magnetic focusing coil.

The modification as shown in FIG. 3 is basically the same as that of FIG. 1 except the optical focusing means is outside of the solenoid and Helmholtz coils are used for deflecting the electrons to angle off the axis.

In operation, the converter tube is assembled and placed onto a rocket, satellite, or any other desired device for operation thereon in the vacuum of outer space to detect short wave length radiation. A negative voltage of about 20 kv. is connected to the cathode end of the accelerating electrode circuitry and the opposite end of the circuitry is connected to ground to provide an electrostatic field between the photoelectrode and the electron sensitive means. A suitable power source is connected to the cylindrical coil to produce an axial magnetic field wherein the electrostatic and magnetic field guides electrons emitted from the photocathode to the electron sensitive element. Parallel waves of electromagnetic radiation such as radiation in the far ultraviolet is incident upon the focusing surface of the mirror wherein the radiation is focused onto the photocathode. The light incident on the photocathode causes the photocathode to emit electrons in accordance to the incidence of the light rays thereon. The electrons are accelerated axially through the magnetic coil by the action of the electrostatic and magnetic fields. The photoelectrons pass through the axial aperture within the mirror and are incident on an electron sensitive element which converts the photoelectrons to visible light or which may be detected by a light detecting device. Visible light resulting from incidence of the photoelectrons onto the electron sensitive material produces a reproduction of the incoming light incident on the mirrored surface and can be transmitted in the case of a satellite to a ground receiver in the form of a television image or by any other suitable arrangement.

The converters as shown by the modifications in FIGS. 2 and 3 effectively operate the same as the device in FIG. 1 with the exception that the photoelectrons are controlled by an additional magnetic deflection means on the outside of the mirrored surface wherein the magnetic deflection means is outside of the area of the cylindrical coil.

As shown by illustration in the FIGS. 1, 2, and 3, the the photocathode and mirror surface arrangement is open to ambient atmosphere and the device does not make use of transmission optics which permits operation of the device for detection in the far ultraviolet electromagnetic radiation regions.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An electro-optical image converter designed for use in the vacuum of outer space which comprises:
   an open window-free structure
   a concave focusing mirror having a reflective surface on one side thereof positoned to receive incident light rays,
   a photocathode spaced from said spherical mirror in optical alignment therewith to receive light focused by said reflective surface of said mirror,
   said photocathode emitting photoelectrons from the surface thereon upon which light is focused by said mirror,
   means for receiving electrons emitted by said photocathode,
   said electron receiving means converting the incident electrons into visible light rays,
   a magnetic-field generating means surrounding said photocathode and said mirror means coaxial therewith,
   an electrostatic field generating means extending along the surface of said magnetic-field generating means for focusing electrons emitted by said cathode onto said electron receiving means,
   said focusing mirror, said photocathode and said electron detectors being open to ambient pressure, whereby
   light incident onto said spherical mirror is free from window transmission.

2. An electro-optical image converter as claimed in claim 1, wherein:
   said electron receiving means is spaced from said magnetic and eletcrostatic field producing means on the axis thereof, and
   a focusing coil is positioned about the axis between said electron receiving means and said magnetic field producing means.

3. An electro-optical image converter as claimed in claim 1, wherein:
   said electron receiving means is off the axis of said magnetic-field producing means, and
   a pair of Helmholtz coils are positioned to guide the electrons emitted by said photocathode onto said electron receiving means, 4. An electro-optical image converter as claimed in claim 1, wherein:

said spherical mirror has an axial aperture through which electrons emitted by said photocathode are focused onto said electron receiving means.

5. An electro-optical image converter as claimed in claim 1, wherein:
said electron receiving means records the incident electrons directly.

References Cited

UNITED STATES PATENTS

| | | | |
|---|---|---|---|
| 2,131,185 | 9/1938 | Knoll | 250—213 |
| 2,256,461 | 9/1941 | Iams | 250—213 X |
| 2,322,361 | 6/1943 | Iams | 250—213 |
| 3,333,133 | 7/1967 | Morton et al. | 250—213 X |
| 3,109,931 | 11/1963 | Knowlton et al. | 250—49.5 |
| 3,229,105 | 1/1966 | Mestwerdt et al. | 313—65 X |

WALTER STOLWEIN, Primary Examiner

U.S. Cl. X.R.

313—65; 250—833